(12) United States Patent
Endoh et al.

(10) Patent No.: US 11,610,083 B2
(45) Date of Patent: Mar. 21, 2023

(54) METHOD FOR CALCULATING CLUSTERING EVALUATION VALUE, AND METHOD FOR DETERMINING NUMBER OF CLUSTERS

(71) Applicant: TOHOKU UNIVERSITY, Miyagi (JP)

(72) Inventors: Tetsuo Endoh, Miyagi (JP); Hui Shen, Miyagi (JP)

(73) Assignee: TOHOKU UNIVERSITY, Miyagi (JP)

( * ) Notice: Subject to any disclaimer, the term of this patent is extended or adjusted under 35 U.S.C. 154(b) by 490 days.

(21) Appl. No.: 16/634,512

(22) PCT Filed: Jul. 5, 2018

(86) PCT No.: PCT/JP2018/025498
§ 371 (c)(1),
(2) Date: May 14, 2020

(87) PCT Pub. No.: WO2019/026523
PCT Pub. Date: Feb. 7, 2019

(65) Prior Publication Data
US 2020/0272861 A1    Aug. 27, 2020

(30) Foreign Application Priority Data
Aug. 3, 2017   (JP) .............................. JP2017-151146

(51) Int. Cl.
*G06K 9/62*     (2022.01)
*G06N 20/00*    (2019.01)
*G06F 16/906*   (2019.01)

(52) U.S. Cl.
CPC ........... *G06K 9/6262* (2013.01); *G06K 9/622* (2013.01); *G06K 9/6272* (2013.01); *G06N 20/00* (2019.01)

(58) Field of Classification Search
None
See application file for complete search history.

(56) References Cited

U.S. PATENT DOCUMENTS 8,214,365 B1 * 7/2012 Manadhata ........... G06F 21/566
707/737
2012/0259609 A1 * 10/2012 Harynuk ................ G16C 20/70
703/12

(Continued)

FOREIGN PATENT DOCUMENTS

CN    107169417 A  *  9/2017  ........... G06K 9/0063
CN    107368856 A  * 11/2017  ........... G06F 21/562

(Continued)

OTHER PUBLICATIONS

Arbelaitz, Olatz et al., "An Extensive Comparitive Study of Cluster Validity Indices", Pattern Recognition, 2013. 01, vol. 46, issue 1, pp. 243-256.

(Continued)

*Primary Examiner* — Mohammed Rachedine
(74) *Attorney, Agent, or Firm* — Fox Rothschild LLP; Robert J. Sacco; Carol E. Thorstad-Forsyth

(57) ABSTRACT

Provided is a method for calculating an evaluation score of clustering quality, based on the number of clusters into which a plurality of data is clustered. The calculating the evaluation score includes: calculating a degree of internal compactness that is a sum of values, each being defined by normalizing a first index value by a first value that is based on a number of data within each cluster, the first index value indicating a degree of dispersion of data within each cluster; calculating a degree of external separation defined by normalizing a sum of a second index value for each cluster by a second value that is based on the number of clusters, the second index value indicating an index of a distance between the clusters; and calculating the evaluation score according to a predetermined formula having, as variables, the degree of internal compactness and the degree of external separation.

9 Claims, 11 Drawing Sheets

(56) References Cited

U.S. PATENT DOCUMENTS

2017/0091274 A1* 3/2017 Guo .................. G06F 16/24544
2017/0091637 A1* 3/2017 Chae ...................... G06N 20/10
2018/0032897 A1* 2/2018 Cao ........................ G06N 20/10

FOREIGN PATENT DOCUMENTS

CN 107480694 A * 12/2017 ........... G06K 9/6223
WO WO-2012055100 A1 * 5/2012 ......... G06F 17/2785

OTHER PUBLICATIONS

Saitta, S. et al., "A Comprehensive Validity Index for Clustering", Intelligent Data Analysis, 2008, vol. 12, No. 6, pp. 529-548.
International Search Report issued in PCT/2018/025498 dated Sep. 25, 2018.
T. Calinski & J Harabasz "A Dendrite Method for Cluster Analysis", Academy of Agriculture, Communications in Statistics, Jun. 27, 1974, 3:1, 1-27.

\* cited by examiner

METHOD FOR CALCULATING CLUSTERING EVALUATION VALUE, AND METHOD FOR DETERMINING NUMBER OF CLUSTERS

CROSS-REFERENCE TO RELATED APPLICATIONS

The present application is a U.S. National Phase of International Patent Application No. PCT/JP2018/025498, filed on Jul. 5, 2018, which claims the benefit and priority of Japanese Patent Application No. 2017-151146 filed on Aug. 3, 2017. The contents of the above applications are incorporated herein by reference in their entirety.

TECHNICAL FIELD

The present invention relates to a method for calculating an evaluation score of clustering and a method for determining the number of clusters.

BACKGROUND ART

Clustering (cluster analysis) for classifying a set of a plurality of data into a plurality of clusters (data groups) is known, and is often used for image analysis, data mining, big data analysis or the like. In clustering, similar data are classified into the same cluster so that data in different clusters are as dissimilar as possible, and tendencies or characteristics of data are extracted based on the classification result.

There are various known clustering algorithms for classifying a plurality of data into clusters, and a representative one of such known clustering algorithms is k-means clustering algorithm. In the k-means clustering algorithm, the number of clusters k is set in advance, k data are arbitrarily selected from all of N data, for example, and those data are set as initial centroids of the k clusters (Step 1). Next, cluster classification is carried out by finding, for each data, a centroid among the centroids of the k clusters, which yields a minimum distance between the centroid and data (Step 2). For each cluster, an average of data within each cluster is set as a new centroid of each cluster (Step 3). Steps 2 and 3 are repeated until the centroid of each cluster is no longer changed.

The clustering algorithms described above classify data into a preset number of clusters, that is, the number of clusters needs to be set in advance.

Typically, in order to determine an optimal number of clusters, clustering is repeated by changing the number of clusters, and an evaluation score is obtained for each clustering result. And the number of clusters when the evaluation score takes an extreme, the maximum or the minimum is determined to be the optimal number of clusters. Various evaluation scores have been proposed, and a representative one of such known evaluation scores is VRC (hereinafter referred to as an evaluation score VRC) (see Non-Patent Literature 1, for example).

The evaluation score VRC is a ratio of a degree of external separation normalized by the number of clusters to a degree of internal compactness normalized by the total number of data. A value of the degree of external separation before normalization in the evaluation score VRC is a sum of each distance between a centroid of each cluster and a global gravity center of all data, each distance being weighted by the number of data within each cluster. A value of the degree of internal compactness before normalization in the evaluation score VRC is a total of a sum of each distance between the centroid of each cluster and each data within each cluster.

CITATION LIST

Non Patent Literature

Non Patent Literature 1: CALINSKI, Tadeusz; HARABASZ, Jerzy. A dendrite method for cluster analysis. Communications in Statistics-theory and Methods, 1974, 3.1: 1-27.

SUMMARY OF INVENTION

Technical Problem

When the evaluation score VRC described above is used, and if there is a larger-area data group or a higher-density data group than the other data groups in all data, there is a tendency that the larger-area data group or the higher-density data group is excessively classified, and the number of clusters increases. In other words, the evaluation score VRC tends to be higher when the larger-area data group or the higher-density data group is not classified into one cluster but into a plurality of clusters.

The present invention has been made in view of the foregoing, and an object of the present invention is to provide a method for calculating an evaluation score of clustering for evaluating clustering quality that can suppress excessive classification, and provide a method for determining the number of clusters based on the evaluation score.

Solution to Problem

A method for calculating an evaluation score according to the invention is a method for calculating, by a calculation apparatus, an evaluation score of clustering quality, based on a number of clusters into which a plurality of data is clustered. The method includes an acquisition step of acquiring information on clustered data, and a calculation step of calculating the evaluation score based on the information. The calculation step includes: calculating a degree of internal compactness that is a sum of values, each being defined by normalizing a first index value by a first value that is based on a number of data within each cluster, the first index value indicating a degree of dispersion of data within each cluster; calculating a degree of external separation defined by normalizing a sum of a second index value for each cluster by a second value that is based on the number of clusters, the second index value indicating an index of a distance between the clusters; and calculating the evaluation score according to a predetermined formula having, as variables, the degree of internal compactness and the degree of external separation.

A method for determining the number of clusters according to the invention includes: calculating evaluation scores for clustering results with different number of clusters using the method for calculating an evaluation score; and determining an optimal value of the number of clusters corresponding to an extreme, a maximum or a minimum of the evaluation scores.

Advantageous Effects of Invention

According to the present invention, the evaluation score is calculated based on the degree of internal compactness and the degree of external separation. The degree of internal compactness is a sum of values, each being defined by normalizing a first index value by a first value that is based on the number of data within each cluster, the first index value indicating a degree of dispersion of data within each cluster. The degree of external separation is defined by normalizing a sum of a second index value for each cluster by a second value that is based on the number of clusters, the second index value indicating an index of a distance between the clusters. Therefore, it is possible to suppress excessive classification.

DESCRIPTION OF EMBODIMENT

Figure 1:
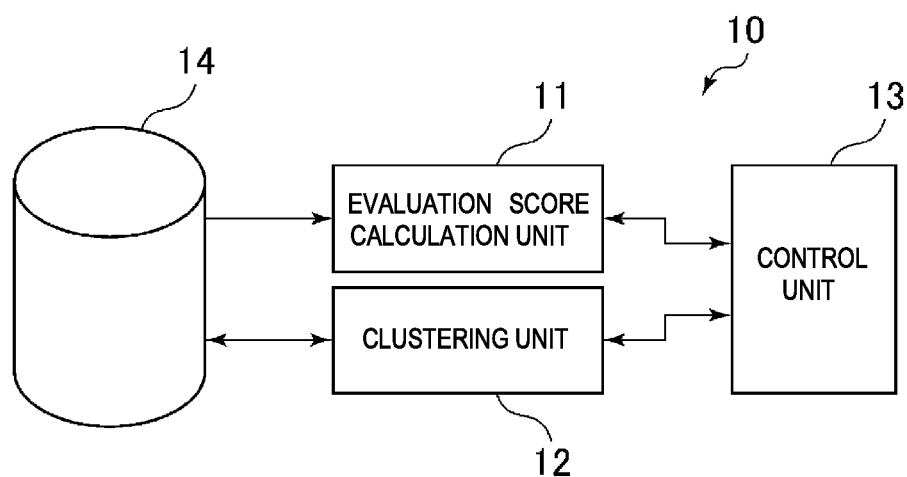
FIG. 1 is a block diagram illustrating a configuration of a calculation apparatus according to embodiments of the present invention.

In FIG. 1, a calculation apparatus 10 is configured to perform clustering on a plurality of data and calculate an evaluation score for evaluating clustering quality so that a clustering result with an optimal number of clusters can be achieved based on the evaluation score. To achieve the optimal number of clusters, the calculation apparatus 10 performs clustering on a plurality of data multiple times by changing the number of clusters. The calculation apparatus 10 is constituted by a computer, for example, and functions as an evaluation score calculation unit 11, a clustering unit 12, a control unit 13 for performing overall control on these units, and a data storage unit 14.

The data storage unit 14 includes a hard disk or memory of the computer, and a plurality of data to be clustered is written in the data storage unit 14 in advance. The data is a q-dimensional vector (q denotes an integer equal to or more than 1), which represents image property, such as color, gray scale or color distribution. For example, in the data storage unit 14, the results of the clustering performed by the clustering unit 12 and computational data obtained during the course of the clustering are written.

The clustering unit 12 reads data to be clustered from the data storage unit 14, performs clustering on the data, and stores the result of the clustering in the data storage unit 14. In this example, the clustering unit 12 performs clustering using k-means clustering algorithm described above. Instead of k-means clustering algorithm, hard clustering algorithm for classifying each data into one cluster may be employed in order for the evaluation score calculation unit 11 to calculate an evaluation score. Examples of such hard clustering algorithms include k-means++ clustering, spectral clustering, single linkage method, and Ward's method.

The evaluation score calculation unit 11 calculates an evaluation score $E1(c)$ each time the clustering unit 12 performs clustering for the number of clusters c (c denotes an integer equal to or more than 2). The evaluation score calculation unit 11 obtains a clustering result as information on the clustered data from the data storage unit 14. Based on the obtained clustering result, the evaluation score calculation unit 11 calculates the evaluation score $E1(c)$ for evaluating the clustering quality for the clustering result. The evaluation score calculation unit 11 outputs the evaluation score $E1(c)$ to the control unit 13. The calculation of the evaluation score $E1(c)$ will be described in detail later.

Examples of the information on the clustered data obtained by the evaluation score calculation unit 11 may include computational data obtained during the course of clustering calculation, such as a centroid within each cluster and within-cluster distances in the k-means clustering algorithm as described later. The information on the clustered data can be used for calculation of the evaluation score $E1(c)$. Using the computational data obtained during the course of the clustering calculation to obtain the evaluation score $E1(c)$ is preferable from the viewpoint of reducing the calculation time, for example.

The control unit 13 compares the evaluation scores $E1(c)$ calculated by the evaluation score calculation unit 11 to determine the optimal number of clusters c. In this example, the control unit 13 determines the number of clusters c corresponding to the evaluation score $E1(c)$ that takes an extreme (a local maximum in this example), to be optimal, according to the hill-climbing method shown in FIG. 2. Specifically, each time an evaluation score $E1(c)$ is calculated, the current evaluation score $E1(c)$ is compared with the immediately preceding evaluation score $E1(c)$. If the current evaluation score $E1(c)$ is smaller than the immediately preceding evaluation score $E1(c)$, the immediately preceding evaluation score $E1(c)$ is regarded as a local maximum, and the number of clusters c corresponding to the immediately preceding evaluation score $E1(c)$ is determined to be optimal.

Figure 2:
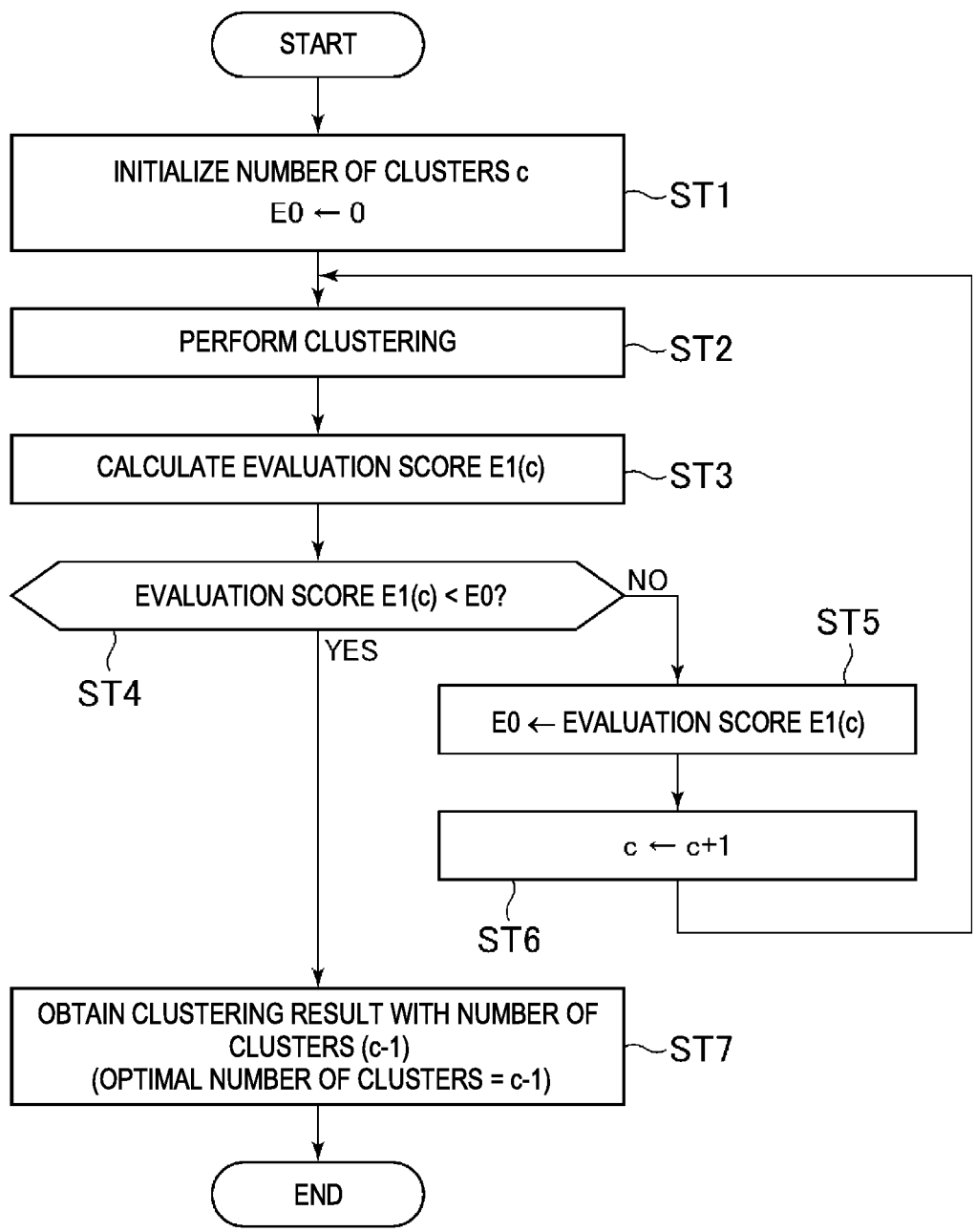
FIG. 2 is a flowchart illustrating a process of obtaining a clustering result in which an evaluation score is a local maximum.

As shown in FIG. 2, in Step ST1, the control unit 13 initializes the number of clusters c and initializes a variable E0, which represents the immediately preceding evaluation score, by setting the variable E0 to 0. The number of clusters c is set to 2 in the initialization in this example. In Step ST2, the control unit 13 causes the clustering unit 12 to perform clustering with the set number of clusters according to the k-means clustering algorithm. In the subsequent Step ST3, the control unit 13 causes the evaluation score calculation unit 11 to calculate an evaluation score E1(c) for the number of clusters c based on the result of the clustering. The number of clusters c is the same as the number of clusters k in the above described k-means clustering algorithm.

In Step ST4, the control unit 13 compares the evaluation score E1(c) calculated this time with the variable E0. In this comparison, if the evaluation score E1(c) is equal to or greater than the variable E0, the clustering unit 12 performs clustering again in Step ST2 after Steps ST5 and ST6. In Step ST5, the variable E0 is set to the evaluation score E1(c) calculated this time, and in Step ST6, the number of clusters c is incremented by one. The next clustering is performed with the number of clusters c thus increased by 1 (in Step ST2), and the evaluation score E1(c) newly obtained in Step ST3 is compared with the immediately preceding evaluation score (in Step ST4).

On the other hand, if the evaluation score E1(c) is smaller than the variable E0, the control unit 13 determines that the evaluation score E1(c) has started decreasing, and obtains the clustering result corresponding to the number of clusters (c-1) in Step ST7. That is, provided that the number of clusters in the last clustering is denoted by c, the control unit 13 determines that the number of clusters (c-1) is the optimal value of the number of clusters.

Figure 3:
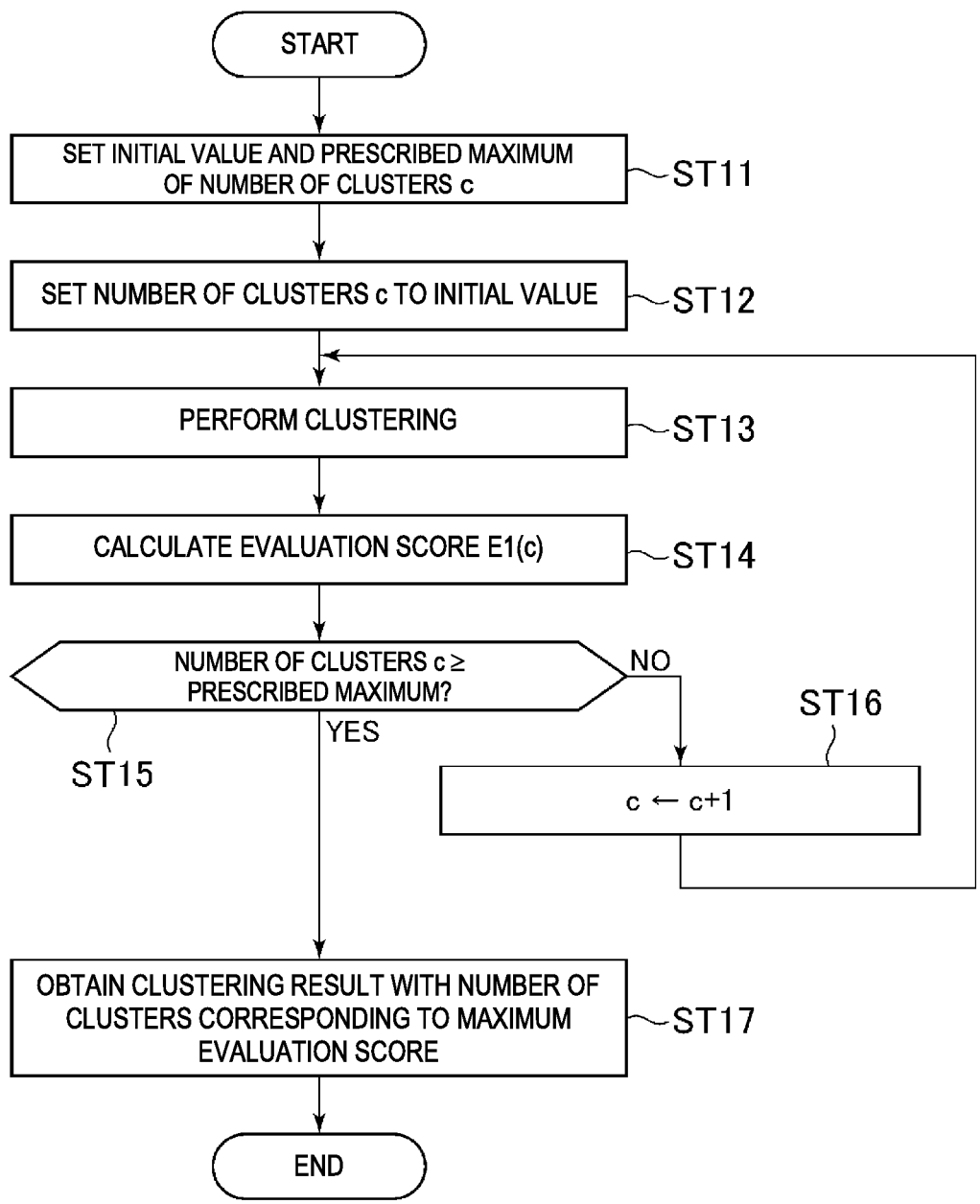
FIG. 3 is a flowchart illustrating a process of obtaining a clustering result in which an evaluation score is a maximum.

Alternatively, the number of clusters corresponding to the maximum evaluation score within the range of the set numbers of clusters c may be determined as an optimal value. In this case, referring to a process shown in FIG. 3, first, in Step ST11, an initial value and a prescribed maximum of the number of clusters c are set, thereby setting the range of the number of clusters c to be evaluated. In Step ST12, the control unit 13 sets the number of clusters c to the initial value. In Step ST13, the clustering unit 12 performs clustering with the number of clusters c set in Step ST12. In the subsequent Step ST14, based on the result of the clustering, the evaluation score calculation unit 11 calculates the evaluation score E1(c) for the number of clusters c. In Step ST15, a determination is made as to whether or not the number of clusters c is equal to or greater than the set prescribed maximum. If the number of clusters c has not reached the prescribed maximum, the number of clusters c is incremented by one in Step ST16, and then clustering is performed again in Step ST13. In this way, clustering is repeated by incrementing the number of clusters c by one until the number of clusters c reaches the prescribed maximum, and the evaluation score E1(c) is calculated for each clustering. After the clustering for the prescribed maximum number of clusters c is completed, the evaluation scores E1(c) calculated for the numbers of clusters c are compared, and the number of clusters c corresponding to the maximum evaluation score E1(c) is determined as an optimal value, and the control unit 13 obtains the clustering result corresponding to the number of clusters c (in Step ST17).

Next, the evaluation score calculated by the evaluation score calculation unit 11 will be described. The evaluation score E1(c) calculated by the evaluation score calculation unit 11 is expressed by the following formula (1).

$$E1(c) = \frac{\sum_{i=1}^{c} \min_{i \neq j} D(v_i, v_j)}{\sum_{i=1}^{c} \frac{1}{n_i} \sum_{x \in c_i} D(x, v_i)} \quad (1)$$

where $D(v_i, v_j) = dist(v_i, v_j)^2$
$D(x, v_i) = dist(x, v_i)^2$

Figure 4:
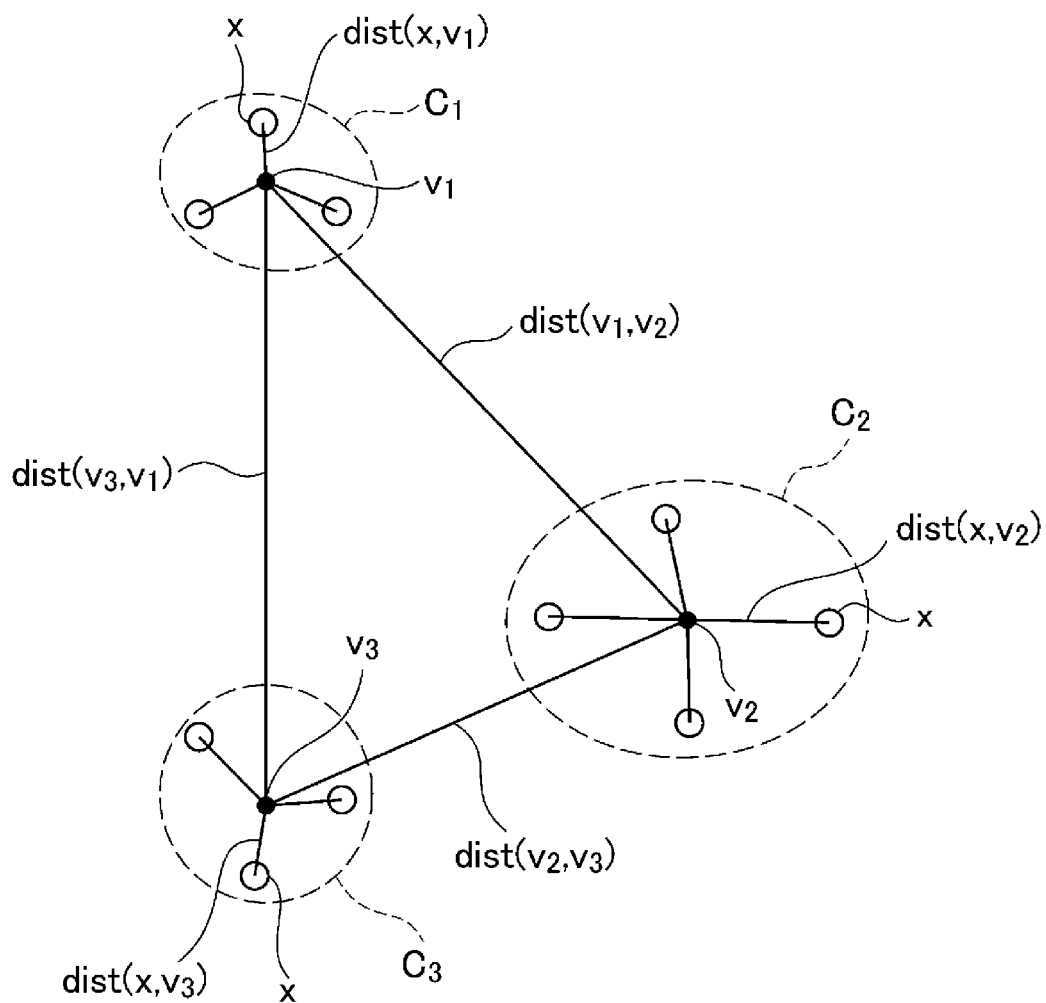
FIG. 4 is an illustration diagram of various values required for calculating an evaluation score $E1(c)$ using a between-cluster distance.

The notation in the formula (1) is listed below. Note that i=1, 2, . . . , c. A cluster centroid is defined as an arithmetic mean of data within each cluster. FIG. 4 schematically shows an example of data x, an i-th cluster $c_i$, a centroid $v_i$ of the cluster $c_i$, a between-cluster distance dist($v_i$, $v_j$) and a within-cluster distance (x, $v_i$).

n: number of data to be clustered (total number of data)
x: data
c: the number of clusters
$c_i$: i-th cluster
$n_i$: number of data within cluster $c_i$
$v_i$: centroid of cluster $c_i$ (cluster centroid)
D(x, $v_i$): within-cluster distance index value of data x within cluster $c_i$
D($v_i$, $v_j$): between-cluster distance index value of cluster $c_i$ and another cluster $c_j$
dist(x, $v_i$): distance between cluster centroid and data x within cluster $c_i$ (within-cluster distance)
dist($v_i$, $v_j$): distance between cluster centroid of cluster $c_i$ and cluster centroid of cluster c (between-cluster distance)

The denominator of the right-hand side of the formula (1) represents a degree of internal compactness indicating a degree of dispersion of data (similarity between data) within each cluster for all the clusters. The within-cluster distance index value (=D(x, $v_i$)) represents a distance (degree of isolation) between a first representative point, which is set within each cluster, as a base point for distance measurement and data within each cluster, and is calculated for each data within each cluster. In this example, the first representative point is defined as a cluster centroid, and the within-cluster distance index value is defined as the square of the within-cluster distance (=dist(x, $v_i$)) which is the distance between the cluster centroid and data.

The degree of internal compactness is calculated as the sum of values, each being defined by normalization of a first index value, the normalization being obtained by dividing the first index value for each cluster by the number of data within each cluster. The first index value for each cluster indicates a degree of dispersion of data within each cluster and, in this example, is the sum of the within-cluster distance index values for each data within each cluster.

The numerator of the right-hand side of the formula (1) represents a degree of external separation indicating a degree of separation between all the clusters. The between-cluster distance index value (=D($v_i$, $v_j$)) represents a distance between one cluster and another cluster. In this example, provided that a second representative point of each cluster used as a base point for distance measurement between clusters is defined as the cluster centroid, the between-cluster distance index value is the square of the between-cluster distance (=dist($v_i$, $v_j$)) between the cluster centroid of one cluster and the cluster centroid of another cluster.

The degree of external separation is defined by normalization of the sum of a second index value for each cluster, which is obtained by dividing the sum by the number of clusters. The second index value indicates a degree of separation between one cluster and another cluster or, in other words, indicates an index of a distance between the one cluster and another cluster. In this example, the second index value is a minimum of the between-cluster distance index values between the clusters.

In this example, both the within-cluster distance and the between-cluster distance are Euclidean distances. Provided that data of two q-dimensional vectors are denoted by a ($a_1$, $a_2$, ..., $a_q$) and b ($b_1$, $b_2$, ..., $b_q$), the Euclidean distance between a and b is expressed by the following formula (A).

$$dist(a, b) = \|a - b\| \quad (A)$$
$$= \sqrt{(a_1 - b_1)^2 + (a_2 - b_2)^2 + \ldots + (a_q - b_q)^2}$$

In the evaluation score $E1(c)$, as described above, the degree of external separation is defined by normalizing the sum of the second index value for each cluster that indicates the degree of separation between clusters, by the number of clusters, and the degree of internal compactness is the sum of values, each being defined by normalizing the first index value that indicates the degree of dispersion of data within each cluster, by the number of data within each cluster. Therefore, even if there is a larger-area data group or a higher-density data group than the other data groups in all data, the degree of dispersion of data within each cluster is appropriately reflected in the degree of internal compactness. That is, excessive classification does not lead to a higher evaluation score $E1(c)$, thereby suppressing the excessive classification.

If the clustering quality is high, the evaluation score $E1(c)$ is accordingly high. Therefore, the number of clusters c can be determined by choosing the evaluation score $E1(c)$ that takes a local maximum or a maximum. When the inverse of the right-hand side of the formula (1) is used as the evaluation score $E1(c)$, the number of clusters c can be determined by choosing the evaluation score $E1(c)$ that takes a local minimum or a minimum. By using the cluster centroid and the between-cluster distance obtained during the course of the calculation in the k-means clustering algorithm, the number of calculations can be advantageously reduced.

Although the second index value, which is an index of the distance between clusters, is obtained using the between-cluster distance index value in the above described evaluation score $E1(c)$, the second index value may be a value obtained using a reference-point-to-cluster distance index value that indicates a distance from a preset reference point to the cluster, such as an evaluation score $E2(c)$ expressed by the following formula (2). The evaluation score $E2(c)$ is obtained by a reduced number of calculations compared with the evaluation score $E1(c)$, as described in detail later.

$$E2(c) = \frac{\sum_{i=1}^{c} n_i D(v_i, m)}{\sum_{i=1}^{c} \frac{1}{n_i} \sum_{x \in c_i} D(x, v_i)} \quad (2)$$

where $D(v_i, m) = dist(v_i, m)^2$
$D(x, v_i) = dist(x, v_i)^2$

Figure 5:
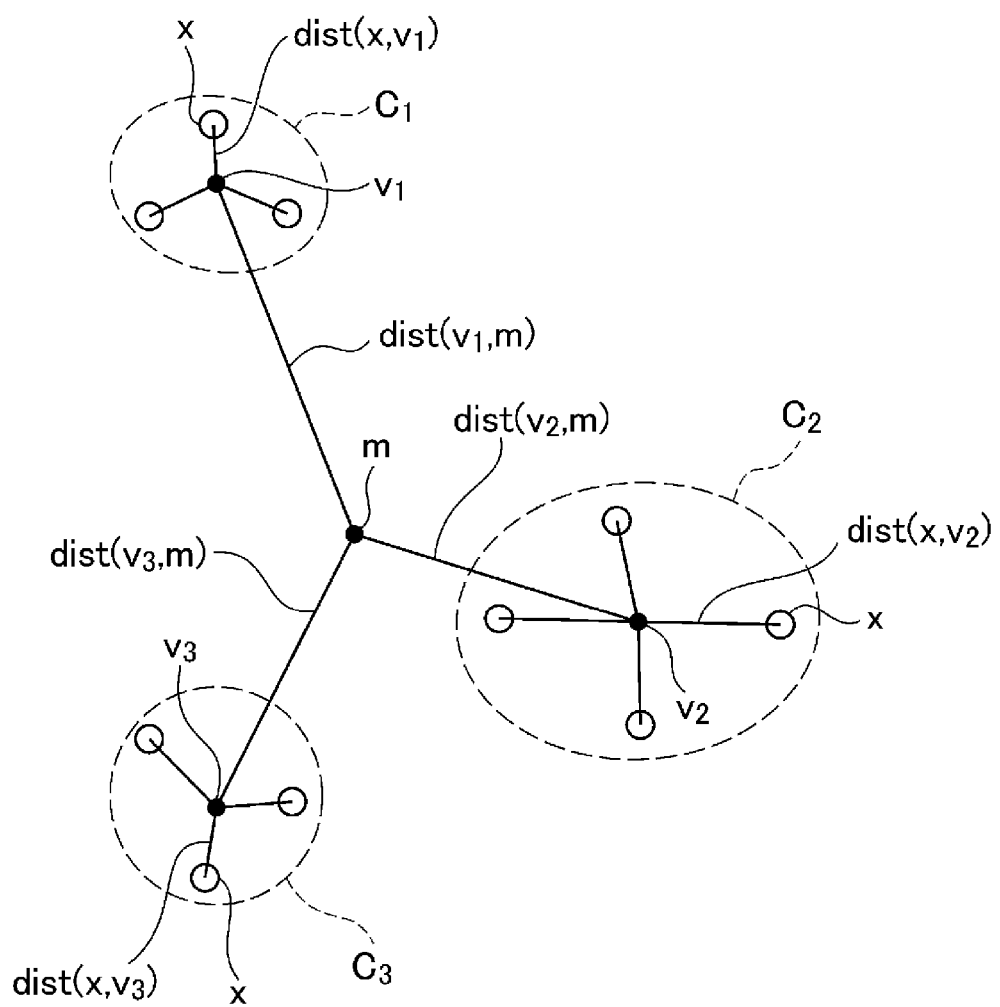
FIG. 5 is an illustration diagram of various values required for calculating an evaluation score $E2(c)$ using a reference-point-to-cluster distance.

The notation in the formula (2) is listed below except for the same variables as those in the formula (1). In this example, the reference point is a global gravity center of all of n data to be clustered. FIG. 5 schematically shows an example of data x, an i-th cluster $c_i$, a centroid $v_i$ of the cluster $c_i$, a reference-point-to-cluster distance $dist(v_i, m)$ and a within-cluster distance $dist(x, v_i)$.

m: reference point
$D(v_i, m)$: reference-point-to-cluster distance index value of cluster $c_i$
$dist(v_i, m)$: distance between cluster centroid of cluster $c_i$ and reference point (reference-point-to-cluster distance)

As with the formula (1) of the evaluation score $E1(c)$, the numerator of the right-hand side of the formula (2) represents the degree of external separation, and the denominator of the right-hand side represents the degree of internal compactness. Although the degree of external separation of the evaluation score $E2(c)$ is also the sum of the second index value for each cluster, the second index value for each cluster is the reference-point-to-cluster distance index value weighted by the number of data within each cluster. In this example, provided that a global gravity center of all of n data to be clustered (referred to as data gravity center) is defined as the reference point, and a second representative point of a cluster used as a base point for distance measurement with respect to the reference point is defined as the cluster centroid, the reference-point-to-cluster distance index value is a square of the reference-point-to-cluster distance (=$dist(v_i, m)$), which is the distance between the reference point and the cluster centroid. The weight of the reference-point-to-cluster distance index value is not limited to the number of data within each cluster but may be a value based on the number of data within each cluster.

In the evaluation score $E2(c)$ described above, as with the evaluation score $E1(c)$, the degree of external separation is defined by normalizing the sum of the second index value for each cluster, which is an index of the distance between clusters, by the number of clusters, and the degree of internal compactness is the sum of values, each being defined by normalizing the first index value for each cluster, which indicates the degree of dispersion of data within each cluster, by the number of data within each cluster. Therefore, an excessive classification does not lead to a higher evaluation score $E2(c)$, thereby reducing excessive classification.

As with the evaluation score $E1(c)$, if the clustering quality is high, the evaluation score $E2(c)$ is accordingly high. Therefore, the number of clusters c can be determined by choosing the evaluation score $E2(c)$ that takes a local maximum or a maximum. When the inverse of the right-hand side of the formula (2) is used as the evaluation score $E2(c)$, the number of clusters c can be determined by choosing the evaluation score $E2(c)$ that takes a local minimum or a minimum.

Instead of using the square of Euclidean distance (within-cluster distance, between-cluster distance, and reference-point-to-cluster distance) as the within-cluster distance index value, the between-cluster distance index value, and the reference-point-to-cluster distance index value given by the evaluation scores $E1(c)$ and $E2(c)$ described above, it is also possible to use the corresponding Euclidean distance itself. Using the square of the corresponding Euclidean distance as described above is advantageous in that the computation amount can be reduced compared with using the Euclidean distance itself.

The within-cluster distance, the between-cluster distance and the reference-point-to-cluster distance in the evaluation scores $E1(c)$ and $E2(c)$ described above are not limited to the Euclidean distance. For example, Manhattan distance expressed by the formula (B) or Minkowski distance expressed by the formula (C) can also be used. A symbol p in the formula (C) denotes an arbitrary value equal to or greater than 1. As is well known, the Minkowski distance is equivalent to the Manhattan distance when p=1, and to the Euclidean distance when p=2. Furthermore, the "point symmetry distance" can also be used, for example.

$$dist(a, b) = |a_1 - b_1| + |a_2 - b_2| + \ldots + |a_q - b_q| \qquad (B)$$

$$dist(a, b) = \left(\sum_{i=1}^{q} |a_i - b_i|^p\right)^{\frac{1}{p}} \qquad (C)$$

Furthermore, in the evaluation scores $E1(c)$ and $E2(c)$, each of the first representative point and the second representative point is defined as the cluster centroid. Here, the first representative point is the base point for measuring the within-cluster distance for each data within each cluster, and the second representative point is the base point of each cluster for measuring the between-cluster distance or the base point of each cluster for measuring the reference-point-to-cluster distance. However, the first and second representative points are not limited to the cluster centroids. For example, the first or second representative point may be data that is closest to the cluster centroid within each cluster. Since the second representative point is a base point for measuring the degree of separation (distance) between clusters or between the reference point and a cluster, the second representative point may be data or the like within an adjacent cluster or within a cluster that is closest to or farthest from the reference point. Alternatively, the first or second representative point may be a point or data within a cluster determined based on another criteria, or an arbitrary point or data within a cluster.

The reference point in the formula (2) can be set to any point or data. Instead of the data gravity center described above, the reference point may be a point or data determined based on another criteria, such as data that is closest to the data gravity center, the second representative point in one of the clusters, an externally specified point or data, data stored at an externally specified address in a storage device, or first input data.

In the evaluation scores $E1(c)$ and $E2(c)$, the degree of internal compactness is obtained by normalizing the first index value by the number of data $n_i$ within each cluster. The number of data $n_i$ within each cluster is referred to as a first value. However, the first value used for the normalization is not limited to the number of data $n_i$ within each cluster, but can be any value based on the number of data $n_i$ within each cluster. Examples of the first value may include a power of the number of data $n_i$ within each cluster (such as $n_i^2$, $n_i^3$, $n_i^{1/2}$ or $n_i^{-2}$), the number of data $n_i$ multiplied by a constant, the number of data $n_i$ plus or minus a constant, or a predefined function of the number of data $n_i$ and the number of clusters c, denoted by $F(n_i, c)$, such as $F(n_i, c) = n_i - c$ or $F(n_i, c) = k*n_i - c$ where k is a constant.

The degree of external separation is obtained by normalization by the number of clusters c as a second value. However, the second value is not limited to the number of clusters c, but any value based on the number of clusters c may be employed as the second value for the normalization. As with the first value, examples of the second value other than the number of clusters c may include a power of the number of clusters c, the number of clusters c multiplied by a constant, the number of clusters c plus or minus a constant, or a predefined function of the number of clusters c and the total number of data n, denoted by $G(n, c)$.

As described above, each of the evaluation scores $E1(c)$ and $E2(c)$ is defined by the ratio between the degree of internal compactness and the degree of external separation. However, formulae for evaluation scores are not limited to the above. The degree of internal compactness described above means that the smaller the degree of internal compactness, the higher the similarity between data within each cluster is, and the more compact the data within each cluster are. On the other hand, the degree of external separation described above means that the greater the degree of external separation, the lower the similarity between the clusters is, and the more separate the clusters are. Therefore, the evaluation score has only to monotonically increase or decrease as the degree of internal compactness decreases or the degree of external separation increases. Any formulae for evaluation scores showing such a behavior can be employed using, as variables, the degree of internal compactness and the degree of external separation.

Instead of the above-described formulae for evaluation scores defined by the ratio between the degree of internal compactness and the degree of external separation, the following formulae can also be employed, such as evaluation scores E defined by weighted sum of one of the degree of internal compactness and the degree of external separation and an inverse of the other, or defined by weighted sum of one of the degree of internal compactness and the degree of external separation and a negative of the other. In the following formulae, Comp denotes the degree of internal compactness, Sep denotes the degree of external separation, Wa and Wb denote weighting constants where Wa and Wa ≠0.

$E=Wb*\text{Sep}+Wa*(1/\text{Comp})$ $E=Wb*(1/\text{Sep})+Wa*\text{Comp}$ $E=Wb*\text{Sep}-Wa*\text{Comp}$ $E=Wa*\text{Comp}-Wb*\text{Sep}$

EXAMPLES

Reference will be made below to examples 1 and 2 in which the optimal number of clusters is determined from the evaluation score $E1(c)$ or $E2(c)$. In the examples 1 and 2, k-means clustering algorithm is used, and the process shown in FIG. 3, which involves choosing the maximum evaluation score, is used to determine the optimal number of clusters. The range of the number of clusters is from 2 to 10. In a comparative example 1, under the same condition, the evaluation score VRC(c) described in Non-Patent Literature 1 is used to determine the optimal number of clusters.

The evaluation score VRC(c) is given by the following formula (3). The notation in the formula (3) is the same as that in the formulae (1) and (2). In the formula (3) of the evaluation score VRC(c), the denominator indicates the degree of internal compactness, and the numerator indicates the degree of external separation.

$$VRC(c) = \frac{\dfrac{\sum_{i=1}^{c} n_i D(v_i, m)}{C-1}}{\dfrac{\sum_{i=1}^{c} \sum_{x \in c_i} D(x, vi)}{n-c}} \qquad (3)$$

-continued where $D(v_i, m) = dist(v_i, m)^2$ $D(x, v_i) = dist(x, v_i)^2$

Figure 6:
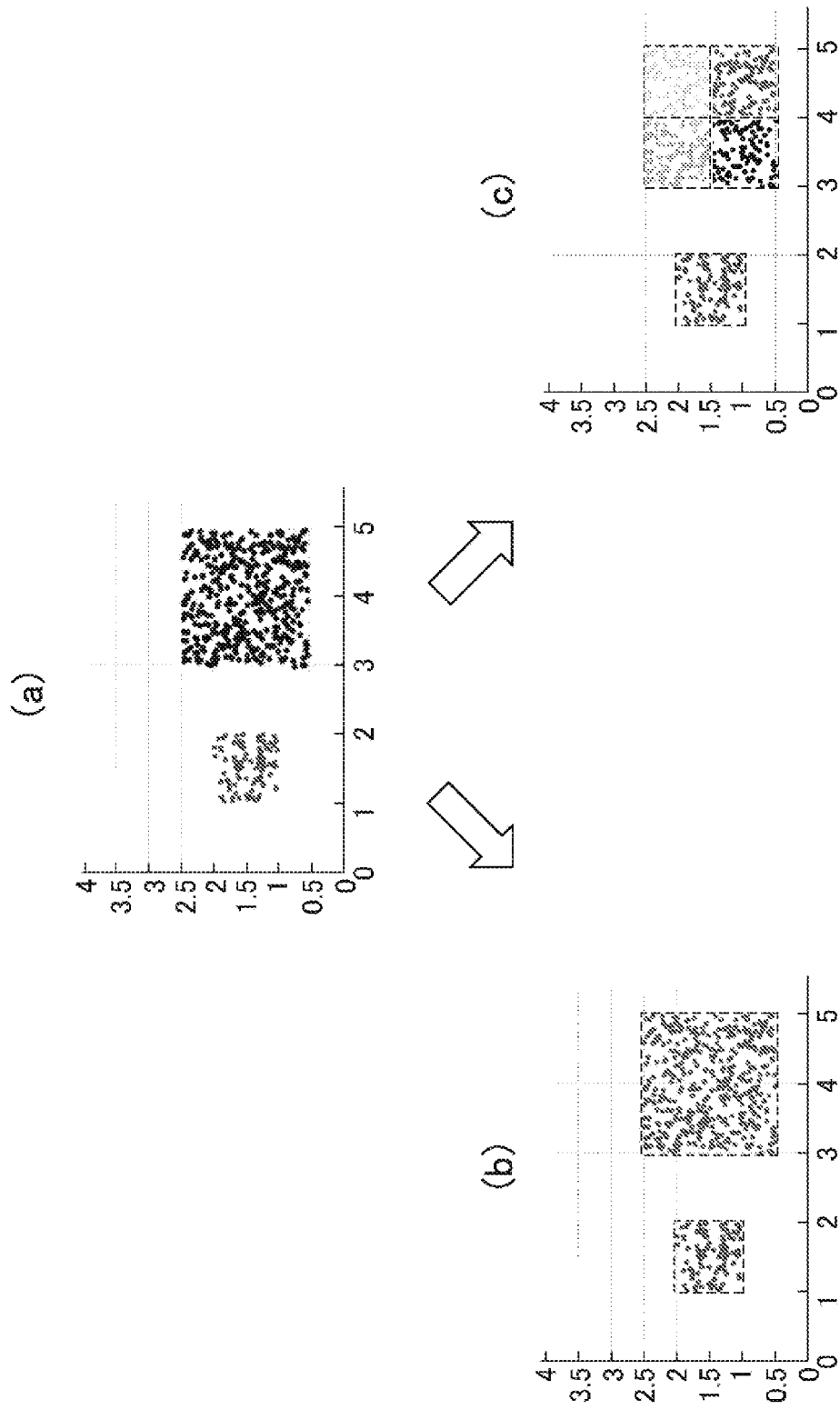
FIG. 6 is an illustration diagram of a sample 1 and classification of data.
Figure 7:
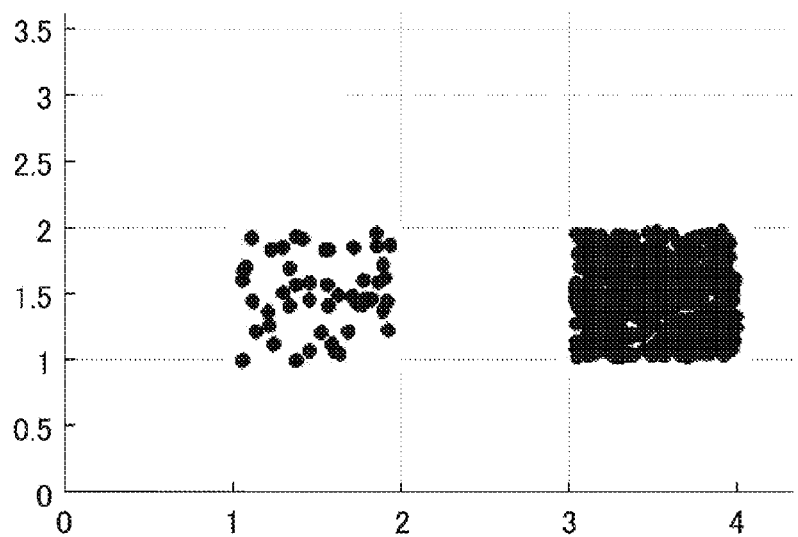
FIG. 7 is an illustration diagram of a sample 2.
Figure 8:
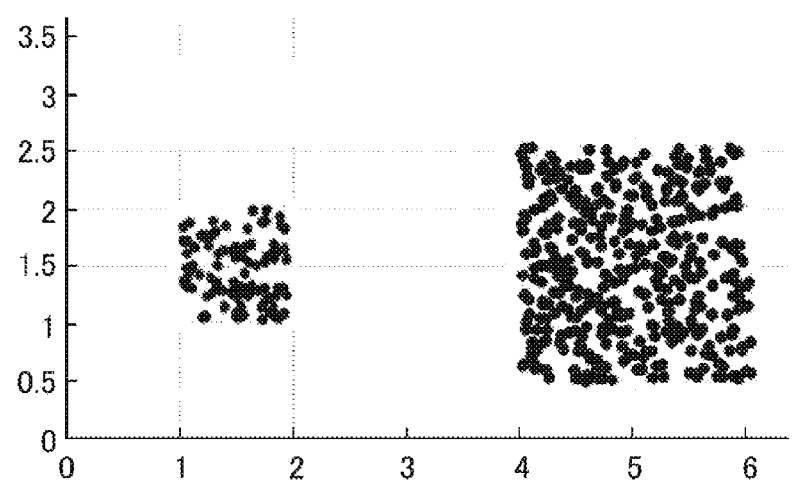
FIG. 8 is an illustration diagram of a sample 3.

In the examples 1 and 2 and the comparative example 1, clustering is performed on a sample 1 shown in (a) of FIG. 6, a sample 2 shown in FIG. 7 and a sample 3 shown in FIG. 8. Each of (a) of FIG. 6, and FIGS. 7 and 8 shows distribution of two-dimensional vector data.

Figure 9:
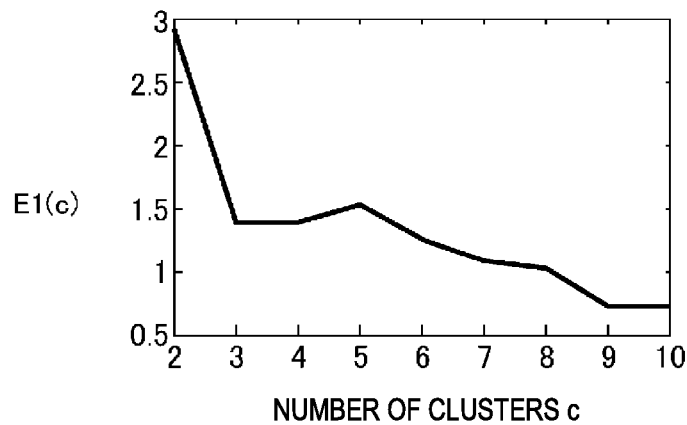
FIG. 9 is a graph illustrating a change in evaluation score $E1(c)$ with respect to the number of clusters for the sample 1.
Figure 10:
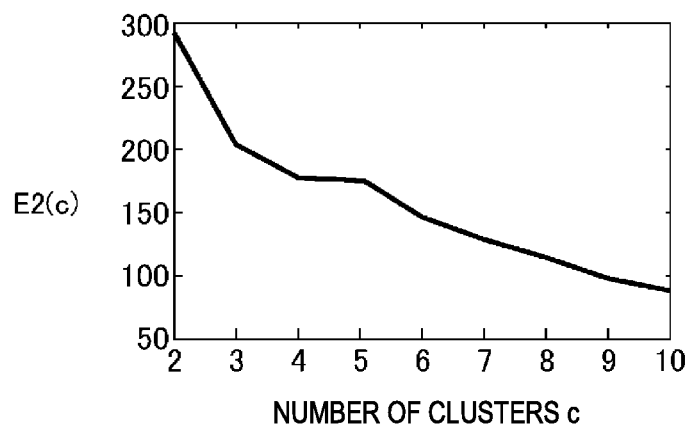
FIG. 10 is a graph illustrating a change in the evaluation score $E2(c)$ with respect to the number of clusters for the sample 1.
Figure 11:
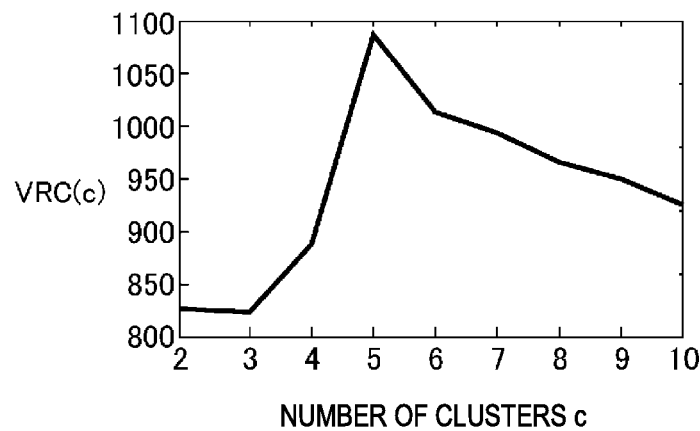
FIG. 11 is a graph illustrating a change in evaluation score $VRC(c)$ with respect to the number of clusters for the sample 1.

In the sample 1, a small region and a large region which is larger in size than the small region are separated from each other, and data of both regions are distributed at the same density. The number of data in the small region is 100, the number of data in the large region is 400, and an area of the large region is four times as large as that of the small region. FIGS. 9 to 11 show changes in the evaluation scores $E1(c)$, $E2(c)$ and $VRC(c)$, respectively, when clustering is performed by changing the number of clusters c in the range of 2 to 10.

The evaluation scores $E1(c)$ and $E2(c)$ take the maximum when the number of clusters c is 2, and the clustering result with c=2 is shown in (b) of FIG. 6 where data in the small region and data in the large region are each classified into one cluster. This result agrees with the human intuitive judgment on the data distribution of the sample 1. On the other hand, the evaluation score $VRC(c)$ takes the maximum when the number of clusters c is 5, and the clustering result with c=5 is shown in (c) of FIG. 6 where data in the small region is classified into one cluster, and data in the large region is classified into four clusters. Note that with the same number of clusters c, the evaluation scores $E1(c)$, $E2(c)$ and $VRC(c)$ indicate the same clustering quality since the same clustering algorithm is used.

Figure 12:
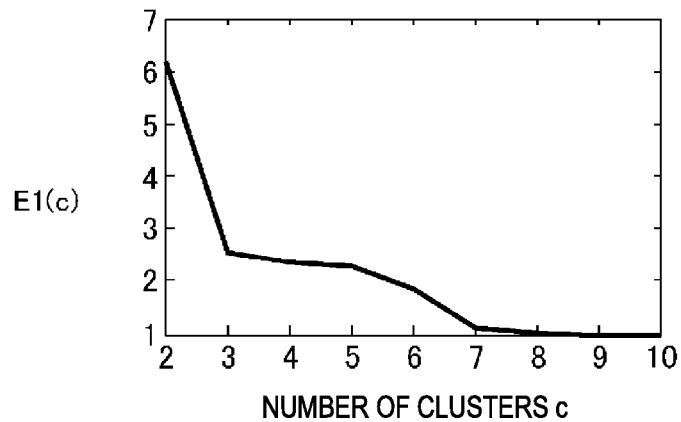
FIG. 12 is a graph illustrating a change in evaluation score $E1(c)$ with respect to the number of clusters for the sample 2.
Figure 13:
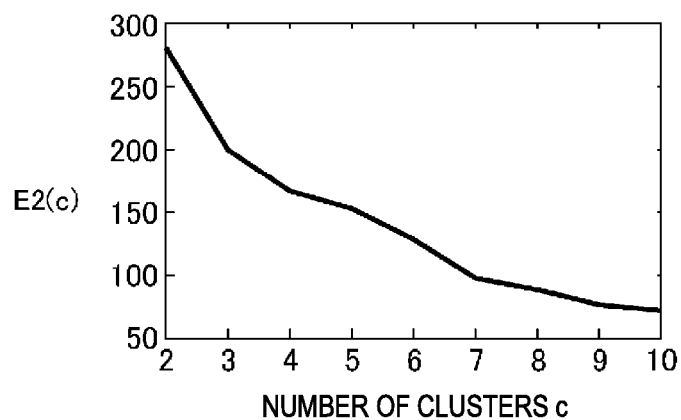
FIG. 13 is a graph illustrating a change in evaluation score $E2(c)$ with respect to the number of clusters for the sample 2.
Figure 14:
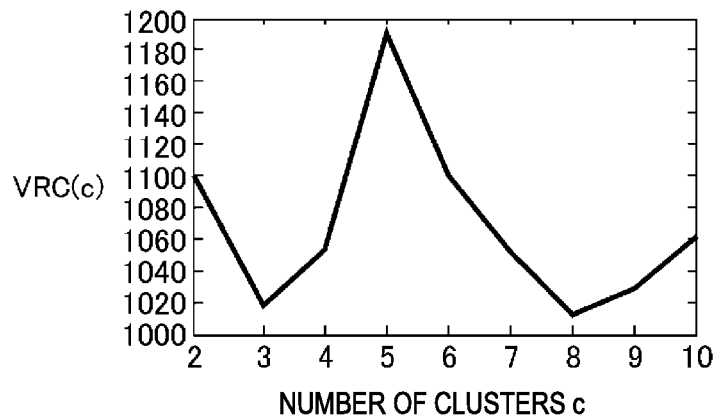
FIG. 14 is a graph illustrating a change in evaluation score $VRC(c)$ with respect to the number of clusters for the sample 2.
Figure 15:
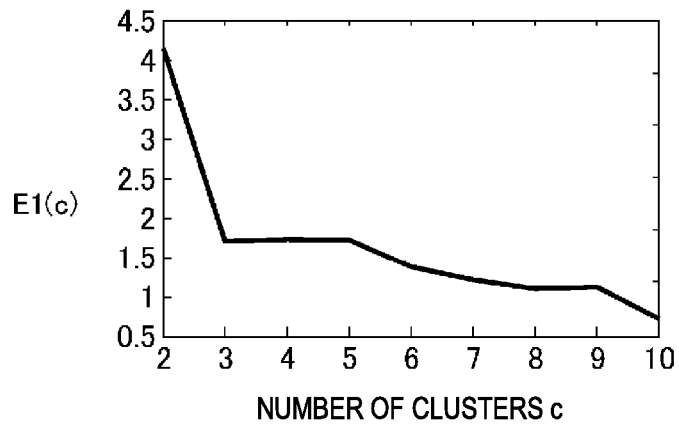
FIG. 15 is a graph illustrating a change in evaluation score $E1(c)$ with respect to the number of clusters for the sample 3.
Figure 16:
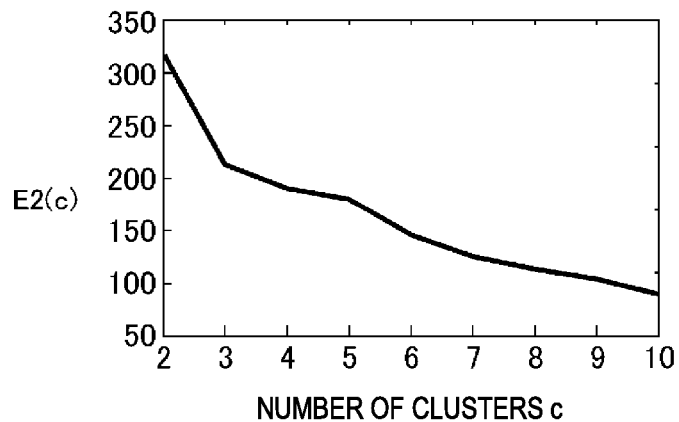
FIG. 16 is a graph illustrating a change in evaluation score $E2(c)$ with respect to the number of clusters for the sample 3.
Figure 17:
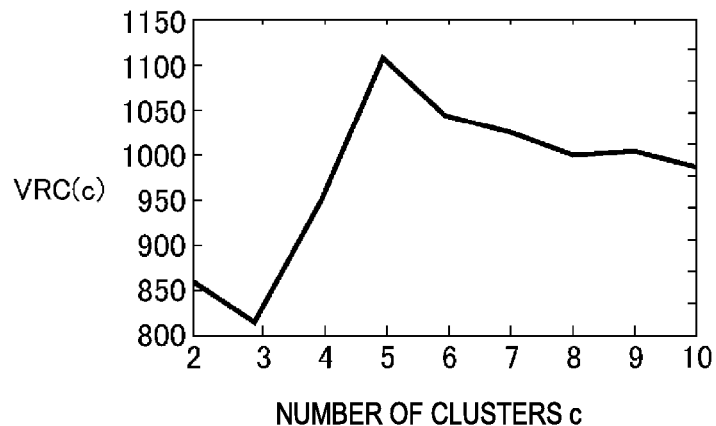
FIG. 17 is a graph illustrating a change in evaluation score $VRC(c)$ with respect to the number of clusters for the sample 3.

In the same manner, changes in the evaluation scores $E1(c)$, $E2(c)$ and $VRC(c)$ for the sample 2 are examined, and the results thereof are shown in FIGS. 12 to 14, respectively, and changes in the evaluation scores $E1(c)$, $E2(c)$ and $VRC(c)$ for the sample 3 are also examined, and the results thereof are shown in FIGS. 15 to 17, respectively.

For the sample 2, data are distributed in a low-density region and a high-density region, both of which have the same size and are separated from each other, the high-density region having a higher data density than the low-density region. For the sample 2, the number of data in the low-density region is 50, and the number of data in the high-density region is 500. For the sample 3, data are distributed in a small region and a large region, both of which are separated from each other and have different densities. The large region has a larger size than the small region, and the large region has a higher data density than the small region. For the sample 3, the number of data in the small region is 50, the number of data in the larger region is 400, and the large region has a four times larger area than the small region.

With respect to the samples 2 and 3, the evaluation scores $E1(c)$ and $E2(c)$ take the maximum when the number of clusters c is 2 as with the sample 1, which shows that data in each region is classified into one cluster. On the other hand, the evaluation score VRC(c) in each of the samples 2 and 3 takes the maximum when the number of clusters c is 5, which shows that data in the low-density region of the sample 2 and data in the small region of the sample 3 are each classified into one cluster, and data in the high-density region of the sample 2 and data in the large region of the sample 3 are each classified into four clusters.

Table 1 shows the evaluation scores for the samples 1 to 3 when the number of clusters c is 2 and 5. In Table 1, the "Result" column for the maximum evaluation score is circled.

TABLE 1

|  |  | Number of clusters c | Sample 1 Evaluation score | Result | Sample 2 Evaluation score | Result | Sample 3 Evaluation score | Result |
|---|---|---|---|---|---|---|---|---|
| Example 1 | E1(c) | 2 | 2.944 | ○ | 6.165 | ○ | 4.177 | ○ |
|  |  | 5 | 1.542 |  | 2.325 |  | 1.727 |  |
| Example 2 | E2(c) | 2 | 287.6 | ○ | 280.2 | ○ | 318.8 | ○ |
|  |  | 5 | 176.5 |  | 153.3 |  | 179.7 |  |
| Comparative Example 1 | VRC(c) | 2 | 829.0 |  | 1102.4 |  | 860.3 |  |
|  |  | 5 | 1088.1 | ○ | 1194.9 | ○ | 1108.2 | ○ |

Table 2 shows details of the degree of internal compactness and the degree of external separation in the evaluation scores $E2(c)$ and VRC(c) for the sample 1 when the number of clusters c is 2 and 5. The degree of internal compactness in the evaluation score $E2(c)$ when the number of clusters c is 5 is slightly lower than that when the number of clusters c is 2, while the degree of internal compactness in the evaluation score VRC(c) when the number of clusters c is 5 is a significantly small value that is less than a third of that when the number of clusters c is 2.

TABLE 2

|  | Example 2 (E2(c)) | | Comparative Example 1 (VRC(c)) | |
|---|---|---|---|---|
| Number of clusters c | 2 | 5 | 2 | 5 |
| Degree of internal compactness | 0.8293 | 0.7766 | 0.5753 | 0.1575 |
| Degree of external separation | 238.4712 | 137.1031 | 476.9424 | 171.3788 |
| Evaluation score | 287.5572 | 176.5428 | 829.0325 | 1088.1194 |

As described above, the degree of internal compactness in the evaluation score $E2(c)$ is the sum of values, each being defined by normalization of the first index value for each cluster, the first index value being defined as the sum of the within-cluster distance index value for each cluster, the normalization being obtained by dividing the first index value by the number of data $n_i$ within each cluster. On the other hand, as is clear from the above formula (3), the degree of internal compactness in the evaluation score VRC(c) is defined by normalization of the sum of the first index value for each cluster, the normalization being obtained by dividing the sum of the first index value by n−c (=total number of data−the number of clusters). Note that, since a change or a value of the number of clusters c is negligible compared with the total number of data n, the normalization is achieved by division by the total number of data n, for the sake of convenience.

As described above, for the sample 1, when the number of clusters c is 2, data in the small region and data in the large region are each classified into one cluster ((b) of FIG. 6), and when the number of clusters c is 5, data in the small region is classified into one cluster, and data in the large region is classified into four clusters ((c) of FIG. 6). When the number of clusters c is 5, since data in the large region is classified into four clusters, the within-cluster distance index value for each data in the four clusters is significantly smaller than the within-cluster distance index value when the number of clusters c is 2. As a result, the first index value (the sum of the within-cluster distance index values) for each of the four clusters also significantly decreases, and the sum of the first index value for each cluster also significantly decreases.

The degree of internal compactness in the evaluation score VRC(c) is defined by normalizing the sum of the first index value for each cluster by the total number of data n, and the total number of data n is a fixed value. Therefore, as the number of clusters c increases, the sum of the first index values significantly decreases, and the degree of internal compactness also accordingly decreases. Thus, the degree of internal compactness in the evaluation score VRC(c) when the number of clusters c is 5 is less than a third of the degree of internal compactness when the number of clusters c is 2.

As described above, the first index value significantly decreases as the number of clusters c increases, and this applies to the evaluation score E2(c). However, with respect to the evaluation score E2(c), as described above, the normalization of the first index value for each cluster is achieved by dividing the first index value by the number of data $n_i$ within each cluster, and the number of data $n_i$ decreases as the range of the cluster becomes narrower. Therefore, even if the first index value decreases as the number of clusters c increases, the change in the degree of internal compactness is small. For this reason, the degree of internal compactness in the evaluation score E2(c) when the number of clusters c is 5 is slightly smaller than the degree of internal compactness when the number of clusters c is 2.

The evaluation scores E2(c) and VRC(c) also vary as the degree of external separation varies with increase or decrease in the number of clusters. With respect to data distribution of the sample 1, the evaluation score VRC(c) takes the maximum when the number of clusters c is 5 because the degree of internal compactness tends to significantly decrease with increase in the number of clusters c as described above, resulting in excessive classification as compared to human intuitive judgment. On the other hand, the evaluation score E2(c) takes the maximum when the number of clusters c is 2 because the degree of internal compactness does not tend to significantly decrease with increase in the number of clusters c, thereby suppressing the excessive classification and leading to agreement with the human intuitive judgment. In this respect, the other samples 2 and 3 are similar to the sample 1, and the evaluation score E1(c) is also similar to the evaluation score E2(c).

Figure 18:
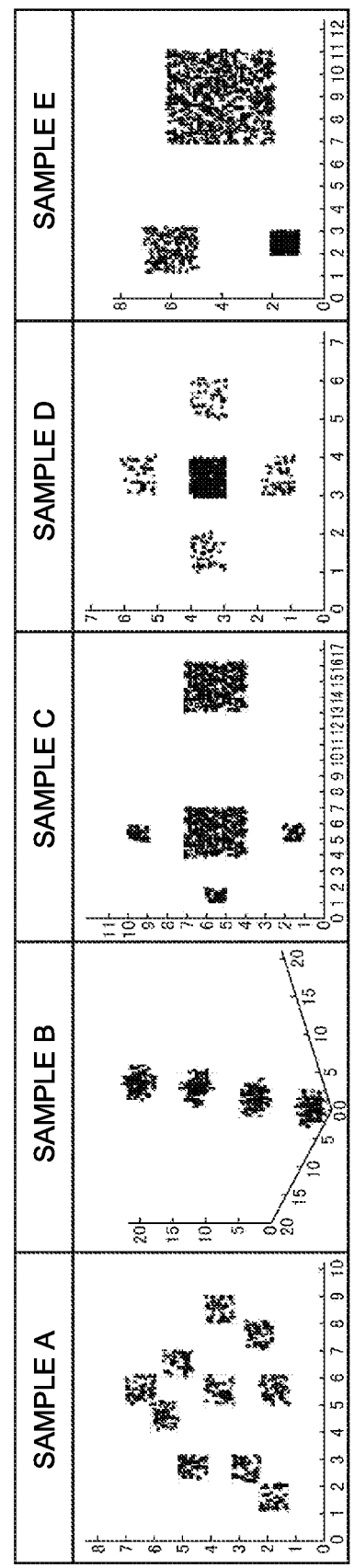
FIG. 18 is an illustration diagram of samples A to E.

For samples A to E shown in FIG. 18, clustering of an example 3 and comparative examples 2 and 3 is carried out. In the example 3, the optimal number of clusters is obtained using the evaluation score E1(c). In the comparative example 2, the optimal number of clusters is obtained using the evaluation score VRC(c). In the comparative example 3, the optimal number of clusters is obtained using a known DB index (hereinafter referred to as an evaluation score DB(c)). Of the samples A to E, data in the sample B are three-dimensional vectors, and data in the other samples are two-dimensional vectors. The evaluation score DB(c) is defined by the following formula (4).

$$DB(c) = \frac{1}{c}\sum_{i=1}^{c} \max_{j \neq i} \{D_{i,j}\} \quad (4)$$

$$\text{where } D_{i,j} = \frac{(\overline{d}_i + \overline{d}_j)}{d_{i,j}}$$

The notation in the formula (4) is as follows:
$d_i$(with overline): average value of within-cluster distances in i-th cluster;
$d_j$(with overline): average value of within-cluster distances in j-th cluster; and
$d_{i,j}$: distance between centroid of i-th cluster and centroid of j-th cluster (between-cluster distance).

As described above, for the evaluation scores E1(c) and E2(c), the degree of internal compactness is the sum of values, each being defined by normalizing the first index value that indicates the degree of dispersion of data within each cluster, by the first value that is based on the number of data within each cluster, and the degree of external separation is defined by normalizing the sum of the second index value for each cluster that is an index of the distance between clusters, by the second value that is based on the number of clusters. Each of the evaluation scores E1(c) and E2(c) is defined as the ratio between the degree of internal compactness and the degree of external separation. On the other hand, in order to calculate the evaluation score DB(c), a pair of clusters having the worst clustering quality is considered, and a ratio between the degree of data dispersion within each of the pair of clusters and the degree of separation between the pair of clusters is calculated for each cluster. The evaluation score DB(c) is the average of the ratios for each cluster, and thus differs from the evaluation scores E1(c) and E2(c).

Table 3 shows optimal numbers of clusters obtained using the evaluation scores. For the evaluation scores E1(c) and VRC(c), the optimal number of clusters is obtained when the evaluation scores take the maximum. For the evaluation score DB(c), the optimal number of clusters is obtained when the evaluation score takes the minimum.

TABLE 3

|  |  | Sample | | | | |
|---|---|---|---|---|---|---|
|  |  | A | B | C | D | E |
| Example 3 | E1(c) | 10 | 4 | 5 | 5 | 3 |
| Comparative Example 2 | VRC(c) | 10 | 4 | 11 | 8 | 6 |
| Comparative Example 3 | DB(c) | 10 | 4 | 2 | 5 | 3 |

In the example 3, for all the samples A to E, the clustering results including the number of clusters agrees with the human intuitive judgment. In the comparative example 2, on the other hand, the number of clusters for the samples C to E is larger, resulting in excessive classification, compared to the number of clusters according to the human intuitive judgment. In the comparative example 3, unlike the comparative example 2, the excessive classification is not shown as compared to the human intuitive judgment, although the number of clusters is small for the sample C. This shows that the evaluation score DB(c) of the comparative example 3 tends to be higher if a plurality of data groups is close to each other and is classified into one cluster.

REFERENCE SIGNS LIST 10 calculation apparatus
11 evaluation score calculation unit
12 clustering unit
13 control unit
14 data storage unit
E1($c$) evaluation score
E2($c$) evaluation score

The invention claimed is:

1. A method for calculating, by a calculation apparatus, an evaluation score of clustering quality, based on a number of clusters into which a plurality of data is clustered, the method comprising:
acquiring information on clustered data; and
calculating the evaluation score based on the information, wherein the calculating the evaluation score comprises:
calculating a degree of internal compactness that is a sum of values, each being defined by normalizing a first index value by a first value that is based on a number of data within each cluster, the first index value indicating a degree of dispersion of data within each cluster;
calculating a degree of external separation defined by normalizing a sum of a second index value for each cluster by a second value that is based on the number of clusters, the second index value indicating an index of a distance between the clusters, wherein the second index value for each cluster is a minimum of between-cluster distances, or a minimum of squares of the between-cluster distances, each of the between-cluster distances being a distance between a second representative point within one of the clusters and a second representative point within another one of the clusters; and
calculating the evaluation score according to a predetermined formula having, as variables, the degree of internal compactness and the degree of external separation.

2. The method according to claim 1, wherein the first index value for each cluster is a sum of within-cluster distances between a first representative point and data within each cluster, or a sum of squares of the within-cluster distances.

3. The method according to claim 2, wherein the first representative point is a centroid of data within each cluster.

4. The method according to claim 1, wherein the first value is the number of data within each cluster.

5. The method according to claim 1, wherein the evaluation score is defined by a ratio between the degree of internal compactness and the degree of external separation.

6. A method for determining a number of clusters, comprising:
calculating evaluation scores for clustering results with different number of clusters using the method according to claim 1; and
determining an optimal value of the number of clusters corresponding to an extreme, a maximum or a minimum of the evaluation scores.

7. A method for calculating, by a calculation apparatus, an evaluation score of clustering quality, based on a number of clusters into which a plurality of data is clustered, the method comprising:
acquiring information on clustered data; and
calculating the evaluation score based on the information, wherein the calculating the evaluation score comprises:
calculating a degree of internal compactness that is a sum of values, each being defined by normalizing a first index value by a first value that is based on a number of data within each cluster, the first index value indicating a degree of dispersion of data within each cluster;
calculating a degree of external separation defined by normalizing a sum of a second index value for each cluster by a second value that is based on the number of clusters, the second index value indicating an index of a distance between the clusters, wherein the second index value for each cluster is a reference-point-to-cluster distance that is weighted based on the number of data within each cluster, or a square of the reference-point-to-cluster distance that is weighted based on the number of data within each cluster, the reference-point-to-cluster distance being a distance between a reference point of all data and a second representative point within each cluster; and
calculating the evaluation score according to a predetermined formula having, as variables, the degree of internal compactness and the degree of external separation.

8. The method according to claim 7, wherein the reference point is a global gravity center of all data.

9. The method according to claim 7, wherein the second representative point is a centroid of data within each cluster.

* * * * *